United States Patent Office 3,669,758
Patented June 13, 1972

3,669,758
PROCESS FOR REMOVING CONTAMINANTS FROM ZIRCONIUM SURFACES
Charles R. Konecny, San Jose, Calif., assignor to General Electric Company
No Drawing. Filed Mar. 20, 1968, Ser. No. 714,441
Int. Cl. C23c *3/00;* C23f *5/02*
U.S. Cl. 148—6.14
12 Claims

ABSTRACT OF THE DISCLOSURE

A process for removing residual contaminants, such as fluorides remaining after acid etching, from zirconium alloy surfaces. This process is especially useful in the fabrication of fuel rods for nuclear reactors in which fuel material is encased in zirconium alloy tubes. In a preferred embodiment, the surface is treated with sodium hydroxide at elevated temperature, rinsed with water and, if desired, preoxidized.

BACKGROUND OF THE INVENTION

Nuclear chain fission reactions and the reactors in which they take place are now well known. A typical nuclear reactor includes a chain reacting assembly or core made up of fissile fuel material contained in fuel elements. The fuel material is encased in a corrosion resistant heat conductive shell or cladding. Often, the cladding is in the form of a long, narrow tube. When this tube is filled with fuel material and the tube ends are plugged, the assembled fuel element is generally known as a "fuel rod."

The reactor core, made up of a plurality of these fuel rods in spaced parallel relationship, is enclosed in a container through which the reactor coolant flows. As the coolant passes between the spaced fuel elements, it is heated by thermal energy released in the fuel material during the fission reaction. The heated coolant then leaves the reactor core, the heat energy is used to perform useful work and the now-cooled coolant is recycled back to the reactor core.

The choice of fuel cladding materials is severely limited by several stringent requirements. The cladding must have a low neutron capture cross-section and low poison-forming tendencies, since either of these characteristics is wasteful of neutrons and fuel. It must have adequate strength under the adverse conditions of temperature, irradiation, and external loading. It must resist corrosion by neighboring materials, coolants and atmospheres. Both dimensional stability and stability with respect to mechanical properties under operating conditions are very important. It should possess good heat-transfer properties such as high thermal conductivity. Of the many materials which have been evaluated for use in fuel cladding, zirconium alloys have been found to have the most suitable combination of the above properties. Generally, small amounts of iron, chromium, nickel and/or tin are alloyed with zirconium to provide increased strength.

Under ideal conditions, these zirconium alloys have excellent corrosion characteristics. However, the presence of very small amounts of certain impurities may seriously adversely affect the corrosion resistance of the zirconium alloy. It has been found that further corrosion can be decreased greatly if a thin uniform film of black zirconium oxide is formed on a very clean zirconium alloy surface. Apparently, this very uniform oxide film resists penetration by oxygen and other agents which would cause adverse corrosion.

Also, it is important to keep hydrogen from the zirconium surface, since even very small amounts of hydrogen in the metal forms a brittle hydride which precipitates during cooling from 600° F. in the form of thin plates. Typically, contamination with only about 60 p.p.m. hydrogen may decrease the impact strength of the zirconium alloy by 75–90%. The thin, uniform black zirconium oxide layer described above is also useful in preventing hydrogen from reaching the zirconium surface. Breaks in the oxide film in the presence of hydrogen may permit severe local hydriding, which may then result in breaks or cracks in the cladding. Radioactive gases produced in the fuel during fission will leak through such cracks and contaminate the reactor coolant.

Thus, it is very important that a uniform, tightly-adherent black zirconium oxide film be formed on the cladding before fabrication of fuel rods. It has been found that the zirconium surface must be very clean to permit the desired oxide film to form. Generally, the surface has been cleaned and etched with a mixture of hydrofluoric and nitric acids to remove the cold worked surface and obtain required tube dimensions. Then, the surface has been rinsed with water and oxidized with steam at high temperatures. Generally, a good quality black zirconium oxide film has been formed by this process. However, there is a tendency for the film to be irregular in the presence of surface contaminants and for a loosely-adhering white oxide film to form. These films do not have the highly desirable resistance to severe corrosion and hydriding that the uniform black zirconium oxide film provides.

Thus, there is a continuing need for improvements in the preparation of zirconium surfaces for exposure to hostile, corrosive environments, such as in nuclear reactors.

SUMMARY OF THE INVENTION

It is, therefore, an object of this invention to provide a process for treating zirconium alloy surfaces which overcomes the above-noted problems.

Another object of this invention is to provide a process for preparing zirconium surfaces for oxidation which removes detrimental surface contaminants.

Another object of this invention is to provide a process for consistently forming a thin, uniform, tightly-adhering black oxide film on zirconium alloy surfaces.

The above objects, and others, are accomplished in accordance with this invention fundamentally, by treating contaminated zirconium alloy surfaces with a concentrated aqueous solution of an alkali metal hydroxide to remove residual contaminants, such as residual fluorides, which interfere with the formation of a desirable black zirconium oxide film on the surfaces.

A preferred overall process includes etching the zirconium alloy surface with a solution comprising hydrofluoric and nitric acids, treating the surface with the alkali metal hydroxide solution, rinsing with water, and pre-oxidizing the surface.

Any suitable alloy comprising predominantly zirconium may be advantageously decontaminated by the process of this invention. Typically, zirconium is alloyed with small amounts of nickel, chromium, iron, tantalum, niobium, tin, etc. to improve strength, ductility and corrosion resistance.

DETAILED DESCRIPTION OF THE INVENTION

It is thought that residual fluoride species left on the zirconium surfaces break down at about 680° F., releasing hydrogen fluoride, preventing the formation of the desired black oxide film. This reaction is thought to take place as follows:

$$Zr(OH)F_3 + 2H_2O \rightarrow Zr(OH)_3F + 2HF$$

The localized deposits of $Zr(OH)_3F$ appear to cause a dislocated oxide structure which allows a higher concentration of oxygen to reach the metal oxide interface. Both increased weight gain and the white appearance of the coating indicate the presence of fluoride contamination within the zirconium oxide coating.

Apparently, the treatment of the contaminated surface with an alkali metal hydroxide results in a reaction typified by:

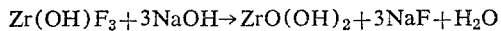

or

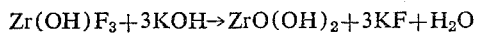

This permits the soluble fluoride to wash away, permitting an excellent black oxide film to form.

This fluoride contamination may result largely from the highly desirable acid-etch process which uses hydrofluoric acid. The acid treatment removes a few mils of metal from the surface. This is important since it removes the thin cold-worked surface layer and permits the tube diameter and tube wall thickness to be accurately brought within very exacting size tolerances. Fluoride contamination may, of course, result from other treatments or sources.

Any suitable alkali metal hydroxide may be used. Effective decontamination may be obtained with concentrations of the alkali metal hydroxide in water ranging from about 300 grams per liter up to the solubility limit of the salt, at a temperature ranging from the ambient temperature to beyond the boiling temperature of the solution. Depending upon the concentration and temperature of the solution, the treatment may typically require from 1 to minute to several hours for complete decontamination.

While any suitable alkaline metal hydroxide may be used, best results are obtained with an aqueous solution of sodium hydroxide, potassium hydroxide or a mixture thereof. Excellent decontamination, together with greatest economy of materials, is obtained with either a sodium hydroxide solution at a concentration of from about 750 to about 1500 grams per liter water or a potassium hydroxide solution at a concentration ranging from about 1000 grams per liter water up to the solubility limit of KOH in water. Preferably, either solution is used at a temperature of from about 100° F. to about 180° F. to treat the contaminated surface for from about 1 to about 60 minutes.

Optimum results have been obtained with an aqueous sodium hydroxide solution having a concentration of about 1000 grams per liter of water, at a temperature of about 150° F. and a treatment period of about 30 minutes and with an aqueous-potassium hydroxide solution having a concentration of about 1400 grams per liter water, at a temperature of about 150° F. and a treatment period of about 30 minutes. Of these, the sodium hydroxide solution is the most economical and gives superior results.

Preferably, the treating solution will be rinsed from the treated surface with one or more water rinses. If the treating solution is allowed to dry on the treated surface, $N_2CO_3$ or $K_2CO_3$ may form, which are less soluble in water than NaOH and KOH, making complete removal of the treating solution more difficult. Best results are obtained where the treated surfaces are rinsed with deionized water at a temperature of about 170° F. within about 6 minutes after the surfaces are removed from the treating solution.

DESCRIPTION OF PREFERRED EMBODIMENTS

Details of the invention will be further understood upon reference to the following examples in which various preferred embodiments of the process of this invention are compared to prior techniques. Parts and percentages are by weight unless otherwise indicated.

Example I

Twenty Zircaloy-2 tubes having a length of about 13 feet and an inside diameter of about 0.5 inch are etched in an aqueous solution containing about 3% hydrofluoric acid and about 37% nitric acid, by volume. The composition of Zircaloy can be found in American Society for Testing Material, ASTM Standards, Part 7, Nonferrous Metals and Alloys B 353-62T, pages 564 (1964). This etch removes a thin surface layer of metal. Ten of these tubes are placed in a rack in a vertical, parallel array. The rack leaves the tube ends open. The rack is placed in a deep tank which is closed by a removable lid. An aqueous solution of sodium hydroxide (about 1000 grams NaOH per 1000 milliliters deionized water) is heated to about 160° F. and is pumped into the tank until the tubes are completely submerged. After about 10 mintes, the NaOH solution is pumped out to a holding tank and the tank is filled with tap water. The tubes are not permitted to dry during the interval between removal of the NaOH and introduction of the water. After the tank is filled with water, the tank is emptied and then refilled with tap water. The water is again drained from the tank. The tank is opened and the rack is removed and placed in a second tap water-filled tank. An air stream is introduced into the bottom of the tank at a pressure of about 10 p.s.i.g. to agitate the water. After 3 minutes, the air is shut off and the water is drained out. Then the tank is filled with deionized water and the air stream is again introduced into the tank. After 3 minutes, the water is drained away and the rack is removed and placed in an autoclave.

A second rack holding the other 10 tubes which are not treated with NaOH is also placed in the autoclave. The autoclave is closed and filled with steam at about 1250 p.s.i. and about 750° F. After about 14 hours, the steam is released and the autoclave is opened.

The NaOH treated tubes are found to have a smooth, lustrous black oxide coating. Chemical analysis of a sample from a tube surface does not reveal the presence of detectable fluoride.

The untreated tubes are found to have an uneven, powdery white coating. Chemical analysis shows the presence of fluoride contamination, apparently in the form of $Zr(OH)_3F$.

Example II

A Zircaloy-2 tube having an internal diameter of about 0.5 inch is divided into a plurality of 2½ inch long samples.

A first group of samples is etched with an aqueous mixture of nitric acid and hydrofluoric acid (about 3% HF and about 37% $HNO_3$, by volume) for about 60 seconds. The solution is allowed to dry on the sample surface. Fluoride contamination is about 130 $\mu$gm./dm.$^2$ fluoride, and is rated as "high."

A second group of samples is similarly etched, held for a few minutes, then are water-rinsed before drying. About 70 $\mu$gm./dm.$^2$ fluoride remains on the sample surface. Fluoride contamination here is rated as "medium."

A third group is etched, then immediately water-rinsed. The surfaces of the samples are substantially free of fluoride contamination. Fluoride contamination here is rated as "low."

Some of these samples are treated by immersion in an aqueous sodium hydroxide bath at a concentration of about 1000 grams NaOH/liter and a temperature of about 180° F. followed by two water rinses.

Treated and untreated samples are then oxidized in an autoclave with steam at about 1250 p.s.i. and about 750° F. for about 14 hours.

After removal from the autoclave, average weight gain is measured and the appearance of the oxidized surface is noted. The results are tabulated in Table I, which follows.

TABLE I

| No. of samples | Fluoride contamination | Treatment | Appearance | Avg. wt. gain (mg./dm.²) |
|---|---|---|---|---|
| 2 | Low | None | Black | 10.3 |
| 2 | Medium | do | White spots | 18.1 |
| 2 | High | do | White | 25.0 |
| 3 | Low | NaOH | Black | 9.3 |
| 2 | High | NaOH | do | 10.4 |

As indicated in Table I, high fluoride contamination without the NaOH treatment gives the undesired white surface and high weight gains. These undesired effects are eliminated by the NaOH treatment.

ples are then treated in aqueous solutions of sodium hydroxide and potassium hydroxide over a wide range of concentrations, temperatures and immersion times. In each case, the sample is rinsed twice with water after treatment, then dried.

The samples are then oxidized by placing them in a container through which steam at about 8 p.s.i.g. and about 750° F. is passed at a rate of about 35 pounds per hour for about 14 hours.

The samples are removed, dried, and the average weight gain due to oxidation is measured. The appearance of the sample surface is noted. Results are given in Table III, following.

TABLE III

| No. of samples | Treatment | Bath conditions | | | Appearance | Avg. wt. gain in oxidation (mg./dm.²) |
|---|---|---|---|---|---|---|
| | | Conc. (g./l.) | Temp. (° F.) | Time (min.) | | |
| 4 | KOH | 100 | 150 | 10 | White | 19.5 |
| 4 | KOH | 150 | 100 | 5 | do | 19.5 |
| 4 | KOH | 150 | 100 | 15 | do | 19.5 |
| 4 | KOH | 150 | 200 | 5 | do | 20.5 |
| 4 | KOH | 150 | 200 | 15 | do | 21.5 |
| 4 | KOH | 500 | 75 | 10 | do | 19.5 |
| 4 | KOH | 500 | 150 | 10 | White spots | 17.5 |
| 4 | KOH | 500 | 212 | 10 | do | 18.0 |
| 4 | KOH | 1,000 | 100 | 5 | do | 20.0 |
| 4 | KOH | 1,000 | 100 | 15 | do | 18.0 |
| 4 | KOH | 1,000 | 200 | 5 | Black | 12.0 |
| 4 | KOH | 1,000 | 200 | 15 | do | 11.5 |
| 4 | KOH | 1,000 | 250 | 5 | do | 10.8 |
| 4 | KOH | 1,400 | 150 | 3 | do | 11.1 |
| 4 | KOH | 1,400 | 150 | 10 | do | 11.0 |
| 4 | KOH | 1,400 | 200 | 18 | do | 9.4 |
| 2 | NaOH | 100 | 150 | 10 | White | 16.0 |
| 2 | NaOH | 150 | 150 | 5 | do | 16.4 |
| 2 | NaOH | 150 | 150 | 15 | do | 12.8 |
| 2 | NaOH | 150 | 200 | 15 | do | 12.7 |
| 2 | NaOH | 500 | 100 | 10 | do | 12.4 |
| 2 | NaOH | 500 | 150 | 5 | do | 7.5 |
| 2 | NaOH | 500 | 150 | 10 | Black | 5.6 |
| 2 | NaOH | 500 | 200 | 10 | do | 5.1 |
| 2 | NaOH | 750 | 150 | 3 | do | 6.3 |
| 2 | NaOH | 750 | 150 | 18 | do | 6.9 |
| 2 | NaOH | 750 | 200 | 5 | do | 6.2 |
| 2 | NaOH | 1,000 | 100 | 15 | Green-black | 3.6 |
| 2 | NaOH | 1,000 | 200 | 5 | do | 3.6 |
| 2 | NaOH | 1,000 | 200 | 15 | do | 4.1 |
| 2 | NaOH | 1,000 | 250 | 5 | do | 3.6 |

Example III

A plurality of samples having high, medium and low fluoride contamination are prepared as described in Example II.

Again, some of the samples are treated by immersion in an aqueous sodium hydroxide bath at a concentration of about 1000 grams/liter and a temperature of about 180° F. followed by two water rinses.

Treated and untreated samples are then oxidized in a low pressure chamber using about 35 pounds per hour of flowing steam at about 8 p.s.i.g. and about 750° F. for about 12 hours.

After removal and drying, average weight gain is measured and the surface appearance is noted. Results are tabulated in Table II, which follows.

TABLE II

| No. of samples | Fluoride contamination | Treatment | Appearance | Avg. wt. gain (mg./dm.²) |
|---|---|---|---|---|
| 3 | Low | None | Black | 10.7 |
| 3 | Medium | do | do | 11.6 |
| 3 | High | do | White | 33.0 |
| 2 | Low | NaOH | Black | 9.3 |
| 2 | High | NaOH | do | 5.0 |

As this data indicates, low fluoride contamination has slightly less adverse effect in the low-pressure system. However, the NaOH treatment shows great improvement where fluoride contamination is high, both in the type of surface oxidation formed and in weight gain.

Example IV

Additional samples with high fluoride contamination are prepared as described in Example II. Groups of sam- As can be seen from the above table, potassium hydroxide is highly effective at a concentration of at least about 1000 grams/liter and a temperature of at least about 200° F., while sodium hydroxide is effective at a concentration of at least about 500 grams/liter and a temperature of at least about 150° F.

Example V

A plurality of samples with low, medium and high fluoride contaminations are prepared as described in Example II.

A first group is not treated. A second group is treated by immersion in an aqueous NaOH solution (about 1000 grams per liter concentration) at about 150° F. for about 30 minutes.

All of the samples are pre-oxidized in a low-pressure system with steam at about 8 p.s.i.g. and about 740° F. for about 14 hours. Then the samples are placed in water at about 2000 p.s.i. and about 750° F. Weight gain is measured after 15 days' exposure. Results are given in Table IV below.

TABLE IV

| No. of samples | Fluoride contamination | Treatment | Avg. wt. gain (Pre-oxidation) (mg./dm.²) | Avg. wt. gain (15 days) (mg./dm.²) |
|---|---|---|---|---|
| 3 | Low | None | 10.3 | 23 |
| 3 | Medium | do | 18.1 | 36 |
| 3 | High | do | 25.0 | 52 |
| 2 | Low | NaOH | 9.3 | 24 |
| 2 | Medium | NaOH | 9.8 | 25 |
| 2 | High | NaOH | 10.4 | 25 |

As these results indicate, the improved oxide film produced by the treatment results in improved long-term corrosion resistance.

Although specific components and proportions have been described in the above examples, other conditions and materials such as those listed above may be used where suitable with similar results. In addition, other materials may be added to the various etching, treating and rinsing solutions to enhance or modify these properties.

Other modifications and ramifications of the present invention will occur to those skilled in the art upon reading the present disclosure. These are intended to be included within the scope of this invention.

I claim:

1. A method of removing fluoride contaminants in the form of $Zr(OH)_3F$ deposits chemically combined with zirconium from the surfaces of zirconium and zirconium alloys which comprises the steps of immersing the surfaces in an aqueous solution comprising at least about 300 grams of an alkali metal hydroxide per liter of water; maintaining the surfaces in contact with said solution for a period of from about 1 minute to about 120 minutes; removing the surfaces from said solution; and rinsing the surfaces with water at least once before the surfaces have become substantially dry.

2. The method of claim 1 wherein said alkali metal hydroxide is selected from the group consisting of sodium hydroxide, potassium hydroxide and mixtures thereof.

3. The method of claim 1 wherein said solution comprises at least about 1000 grams of potassium hydroxide per liter water; said solution is maintained at a temperature in the range of from about 100° F. to about 180° F.; and said contact between the surface and said solution is maintained for a period of from about 1 minute to about 60 minutes.

4. The method of claim 1 wherein said solution comprises about 1400 grams of potassium hydroxide per liter of water; said solution is maintained at a temperature of about 150° F.; and said contact between said solution and the surface is maintained for about 30 minutes.

5. The method of claim 1 wherein said solution comprises from about 750 to about 1500 grams of sodium hydroxide per liter of water; said solution is maintained at a temperature in the range of from about 100° F. to about 180° F.; and said contact between the surface and said solution is maintained for a period of from about 1 minute to about 60 minutes.

6. The method of claim 1 wherein said solution comprises about 1000 grams of sodium hydroxide per liter of water; said solution is maintained at a temperature of about 150° F.; and said contact between the surface and said solution is maintained for about 30 minutes.

7. A method of preparing zirconium and zirconium alloy tubes for use as cladding for nuclear reactor fuel material which comprises the steps of etching said tubes with a solution comprising nitric acid and hydrofluoric acid; rinsing said tubes at least once with water; immersing said tubes in an aqueous solution comprising at least about 300 grams of an alkali metal hydroxide per liter of water to remove $Zr(OH)_3F$ deposits chemically combined with said tubes; maintaining said tubes in contact with said solution for a period of from about 1 minute to about 120 minutes; removing said tubes from said solution; and rinsing said tubes at least once with water before said tubes have become substantially dry.

8. The method of claim 7 wherein said alkali metal hydroxide is selected from the group consisting of sodium hydroxide, potassium hydroxide and mixtures thereof.

9. The method of claim 7 wherein said solution comprises at least about 1000 grams of potassium hydroxide per liter water; said solution is maintained at a temperature in the range of from about 100° F. to about 180° F.; and said contact between the surface and said solution is maintained for a period of from about 1 minute to about 60 minutes.

10. The method of claim 7 wherein said solution comprises about 1400 grams of potassium hydroxide per liter of water; said solution is maintained at a temperature of about 150° F.; and said contact between said solution and the surface is maintained for about 30 minutes.

11. The method of claim 7 wherein said solution comprises from about 750 to about 1500 grams of sodium hydroxide per liter of water; said solution is maintained at a temperature in the range of from about 100° F. to about 180° F.; and said contact between the surface and said solution is maintained for a period of from about 1 minute to about 60 minutes.

12. The method of claim 7 wherein said solution comprises about 1000 grams of sodium hydroxide per liter of water; said solution is maintained at a temperature of about 150° F.; and said contact between the surface and said solution is maintained for about 30 minutes.

References Cited
UNITED STATES PATENTS

| | | | |
|---|---|---|---|
| 2,734,837 | 2/1956 | Hands | 134—27 |
| 2,961,355 | 11/1960 | Beak et al. | 134—27 |
| 3,067,070 | 12/1962 | Loucks | 134—27 |

OTHER REFERENCES

Mellor, Inorganic and Theoretical Chemistry Treatise, vol. 7, p. 138.

J. H. STEINBERG, Primary Examiner

U.S. Cl. X.R.

134—27; 156—18; 252—79.5

UNITED STATES PATENT OFFICE
CERTIFICATE OF CORRECTION

Patent No. 3,669,758          Dated June 13, 1972

Inventor(s)     Charles R. Konecny

It is certified that error appears in the above-identified patent and that said Letters Patent are hereby corrected as shown below:

Column 2, line 67, after "desired" insert --uniform--. Column 3, line 33, after "1" delete "to"; line 61, change "$N_2CO_3$" to --$Na_2CO_3$--. Column 4, line 8, change "pages" to --page-- (preceeding "564").

Signed and sealed this 2nd day of January 1973.

(SEAL)
Attest:

EDWARD M. FLETCHER, JR.
Attesting Officer

ROBERT GOTTSCHALK
Commissioner of Patents